June 9, 1925.  1,541,640
L. W. GROHS
DRAFT EQUALIZER
Original Filed March 18, 1921
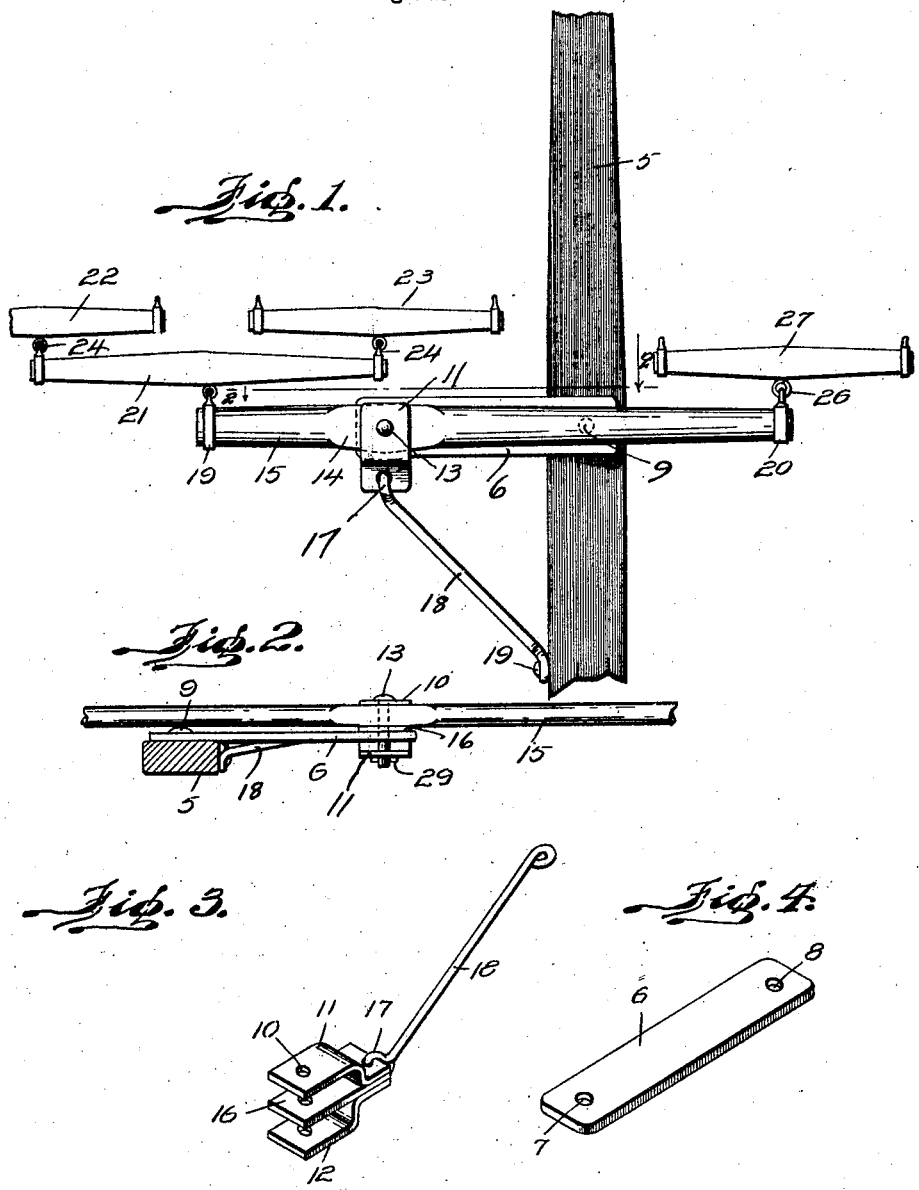
Witness
Inventor
Louis W. Grohs.
By Attorney Patented June 9, 1925.

1,541,640

UNITED STATES PATENT OFFICE.

LOUIS W. GROHS, OF RACINE, WISCONSIN.

DRAFT EQUALIZER.

Application filed March 18, 1921, Serial No. 453,211. Renewed January 27, 1925.

*To all whom it may concern:*

Be it known that I, LOUIS W. GROHS, a citizen of the United States, residing at Racine, in the county of Racine and State of Wisconsin, have invented certain new and useful Improvements in Draft Equalizers, of which the following is a specification.

This invention relates to draft appliances and more particularly to a new and improved draft equalizer for three horses which may be attached to the tongue of a vehicle, plow or the like and adapted for attachment to various types of agricultural implements.

The primary object of the invention is the construction of a draft appliance wherein the draft power may be regulated with respect to the vehicle being drawn such as in side hill plowing for instance wherein greater power is required on one side of the draft tongue than on the other.

A further object of the invention is to provide a draft appliance for the purpose referred to, and which includes an eccentrically mounted equalizing member or evener bar having its short arm for use in connection with a team of horses and its long arm for use in connection with a single horse, and further with the long arm of the bar extending across the draft tongue to allow the single horse to be placed on the free end of said arm at one side of the tongue, and further to allow the team of horses to be placed on the free end of the short arm at the other side of the tongue, whereby the draft power will be regulated with respect to the vehicle in side hill plowing.

With these objects in view and others which will be suggested and manifest as the purpose and nature of my invention are revealed in the following specification and drawing, wherein I have shown a preferred embodiment thereof, Figure 1 is a plan view of the improved equalizer.

Fig. 2 is a section taken on the line 2—2 of Fig. 1.

Fig. 3 is a detached view of a connecting element, and,

Fig. 4 is a detached perspective view of the connecting bar.

The improved device is generally attached to the draft tongue of agricultural implements, such as plows, harvesters, binders, and the like, a portion of the tongue of such vehicle being represented at 5.

A lateral support in the form of a flat rectangular bar 6, preferably of metal, has its inner end terminal portion mounted on the draft tongue 5. The bar 6 is formed with an opening 8, through which extends a holdfast device 9 for fixedly securing it to the draft tongue 5.

Mounted over and of a length to project from each end of the bar 6 and from each side of the tongue 5 is an eccentrically pivoted equalizing member in the form of a double tree 15, having an eccentrically disposed flattened portion 14. Extending through the flattened portion 14 and bar 6 is a pivot bolt 13, arranged in close proximity to the outer end of the bar 6. That portion of the double tree 15 extending inwardly from the bolt 13 is of materially greater length than that portion extending outwardly therefrom.

Interposed between and abutting against the lower face of the flattened portion 14 and the top of the bar 6, as well as projecting rearwardly from the latter, is a flat rectangular combined spacing and bearing plate 16. Arranged above the double tree 15 and below the bar 6 are respectively upper and lower offset retaining plates 11, 12, which project rearwardly from the tree 15 and bar 6 and abut against the faces of the plate 16 at the rear thereof. The plates 11, 12 and 16, at their forward ends have aligning openings, indicated at 10, and through which extends the pivot bolt 13. The plates 11, 12 and 16 are also provided with aligning openings at the rear thereof and through which extends the looped shape forward end terminal portion 17, of a forwardly extending and outwardly inclined rigid connecting rod 18, having its rear terminal portion disposed in parallelism with and fixedly secured to one side edge of the tongue 5, by the holdfast device 19.

The flattened portion 14 of the double tree 15, provides an enlarged bearing surface for the latter, against the plates 11 and 16, when the double tree 15 swings on the pivot bolt 13.

The outer ends of the doubletree 15 are provided with collars 19, 20, respectively, one of them being connected to a doubletree 21 which is provided with whiffle-trees 22, 23 at its respective ends connected to the doubletree by links 24. The opposite end of the doubletree 15 is also connected by links 26 to a whiffletree 27 thereby affording a single draft attachment on one side of the tongue 5 and double draft attachment on the other side. The pivot bolt 13 is secured by a cotter pin 29 beneath the lower retaining plate 12. The arrangement of the plates 11, 12 and 16, in connection with the bolt 13, provides means whereby one type of draft attachment may be easily removed from the tongue and another type of equalizer mounted with respect thereto. The plates also form a ready attachment for the bar 6, and is also securely braced by the connecting rod 18 to the side of the tongue, providing a firm and rigid structure, which will be extremely durable and capable of withstanding rough and excessive strains in agricultural work.

Having shown and described my invention, what I now claim as new and desire to secure by Letters Patent of the U. S. is:—

In combination a draft tongue, a lateral support having its inner end fixed thereto, an equalizing member mounted over and of a length to project from the ends of the support and the sides of the tongue, a pivot bolt extending through said member and support in close proximity to the outer end of the latter, that portion of said member extending inwardly from said bolt being of materially greater length than that portion extending outwardly therefrom, a flat rectangular combined spacing and bearing plate interposed between and abutting directly against said support and member and further extended rearwardly therefrom, offset upper and lower retaining plates opposing respectively the top of said member and bottom of the support and abutting against the faces of said bearing plate at the rear thereof, and a forwardly directed outwardly inclined rigid rod having its forward end extending through and connected to the abutting portions of said plates and its rear end disposed parallel to and fixedly secured against one side edge of said tongue.

In testimony whereof, I affix my signature hereto.

LOUIS W. GROHS.